May 10, 1927.
B. D. HORTON
1,628,406
SERVICE SWITCH AND APPURTENANT PROTECTIVE FITTING
Original Filed March 26, 1919    8 Sheets-Sheet 2
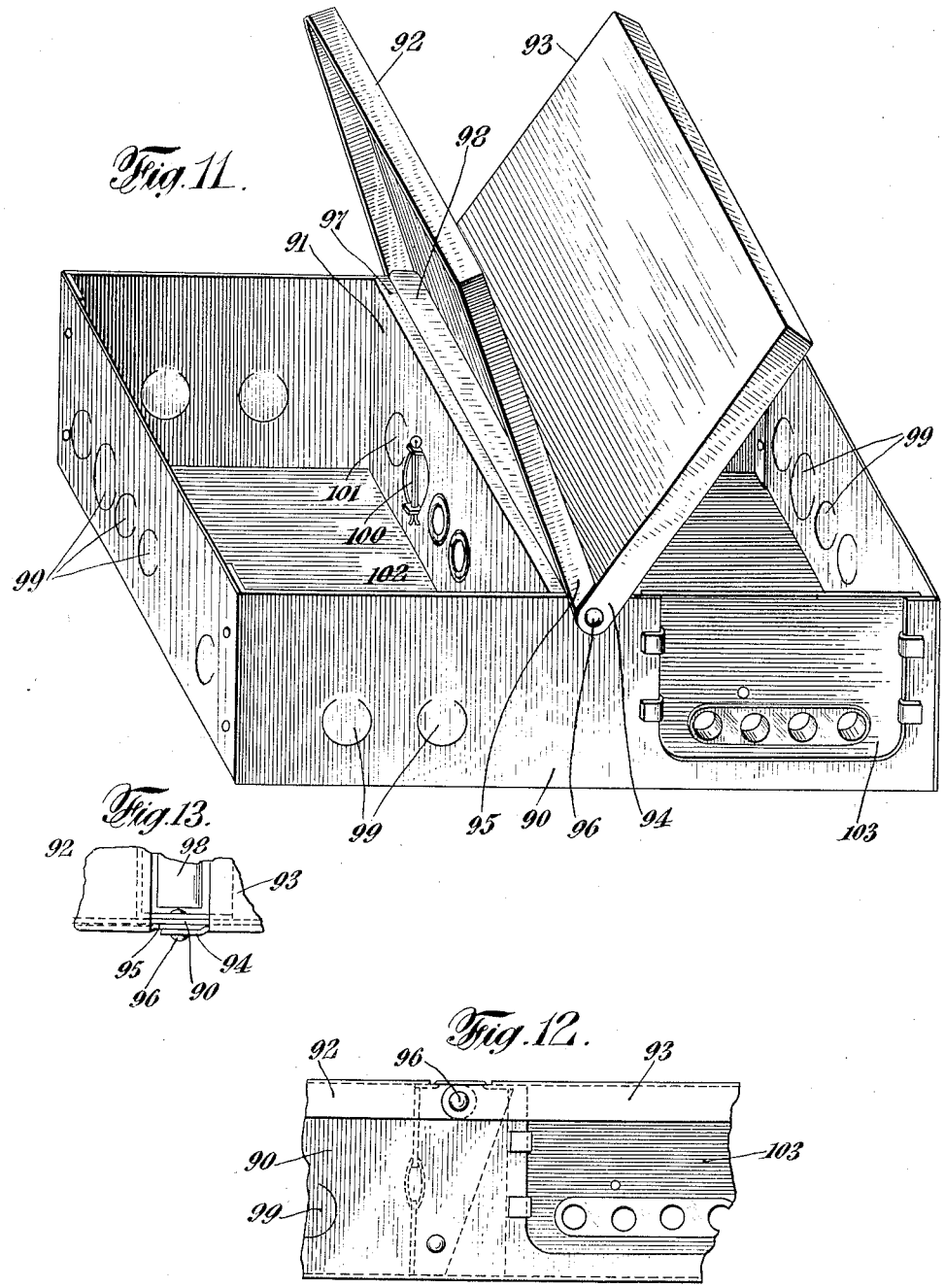
INVENTOR
Bryson D. Horton
BY
ATTORNEY

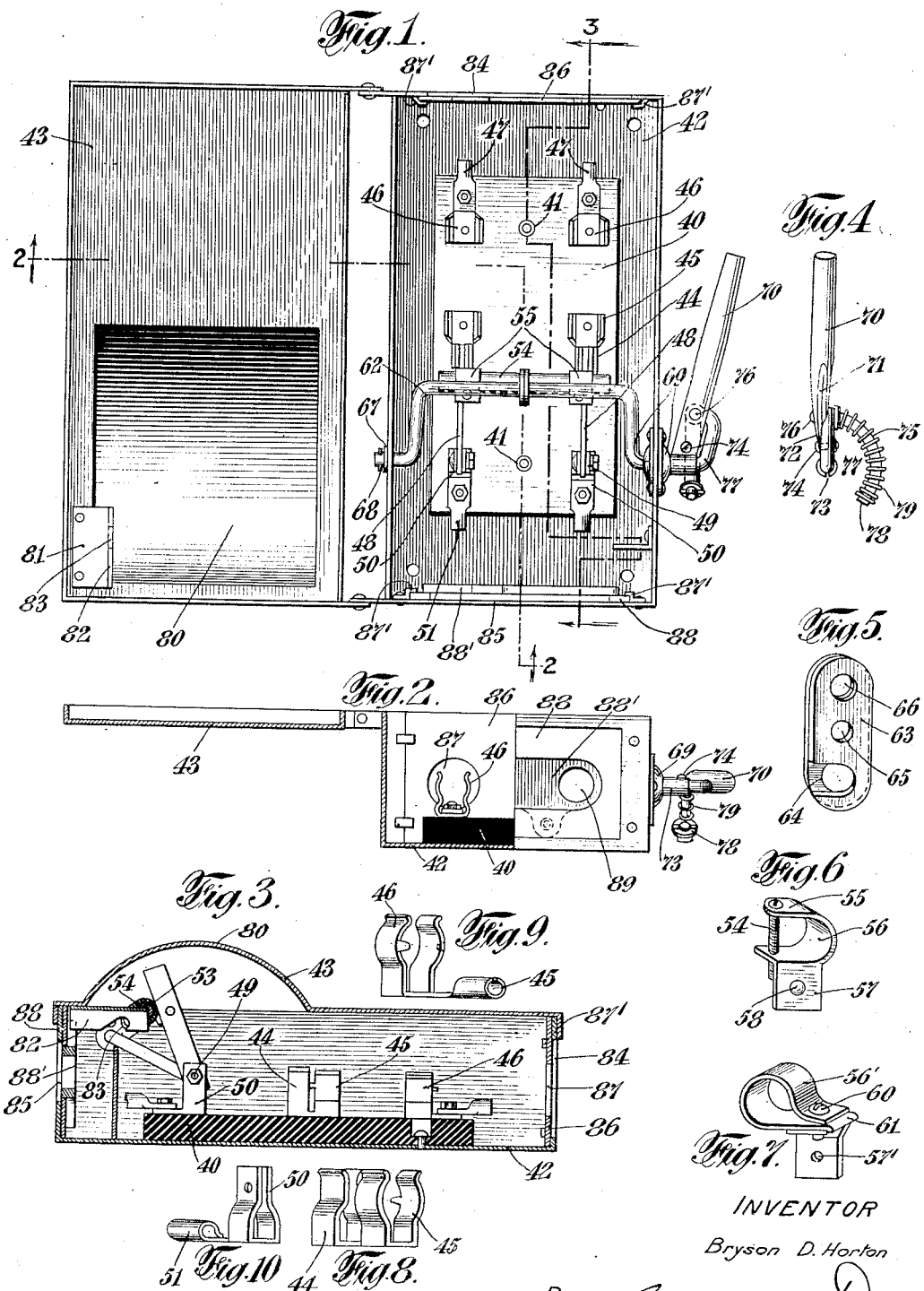

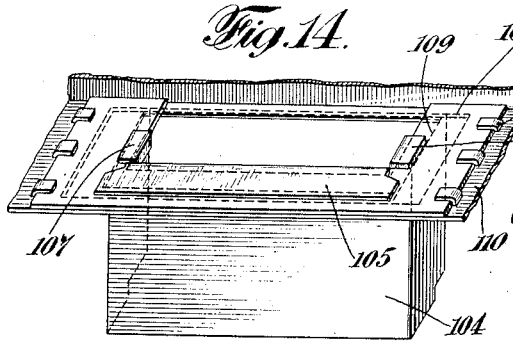
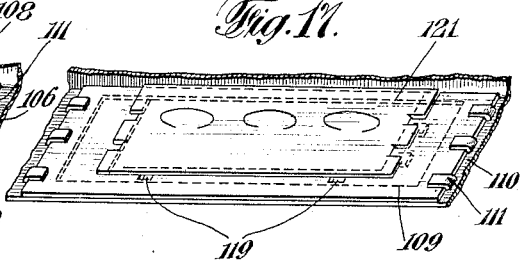
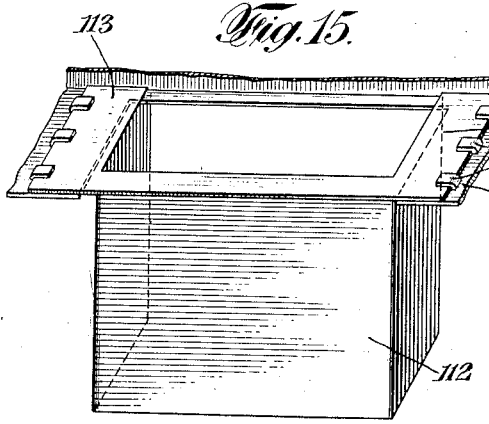
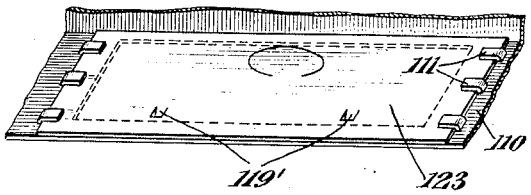
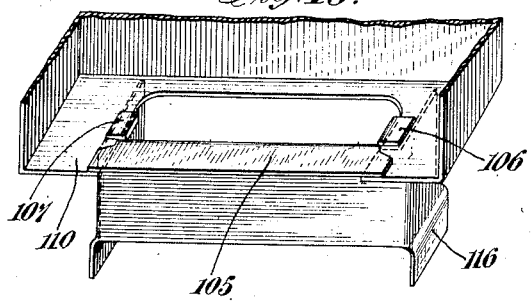
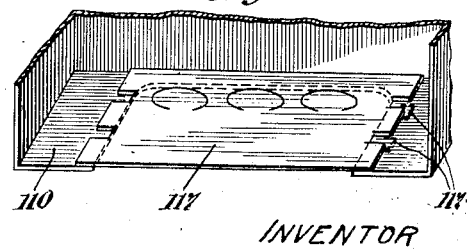
INVENTOR
Bryson D. Horton
BY
ATTORNEY May 10, 1927.
B. D. HORTON
1,628,406
SERVICE SWITCH AND APPURTENANT PROTECTIVE FITTING
Original Filed March 26, 1919   8 Sheets-Sheet 4
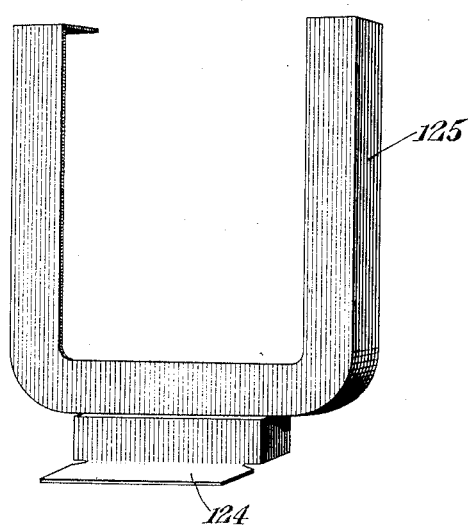
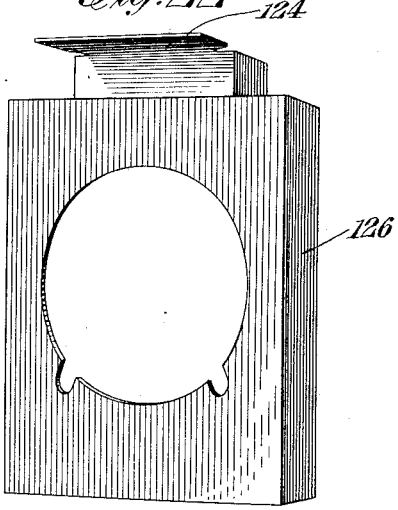
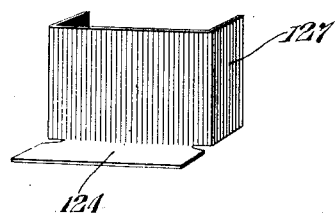
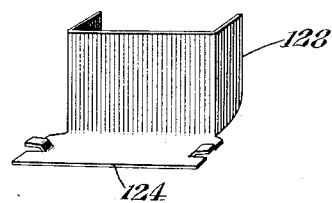
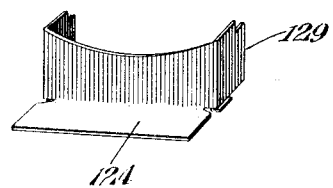
INVENTOR
Bryson D. Horton
ATTORNEY May 10, 1927.
B. D. HORTON
1,628,406
SERVICE SWITCH AND APPURTENANT PROTECTIVE FITTING
Original Filed March 26, 1919    8 Sheets-Sheet 5
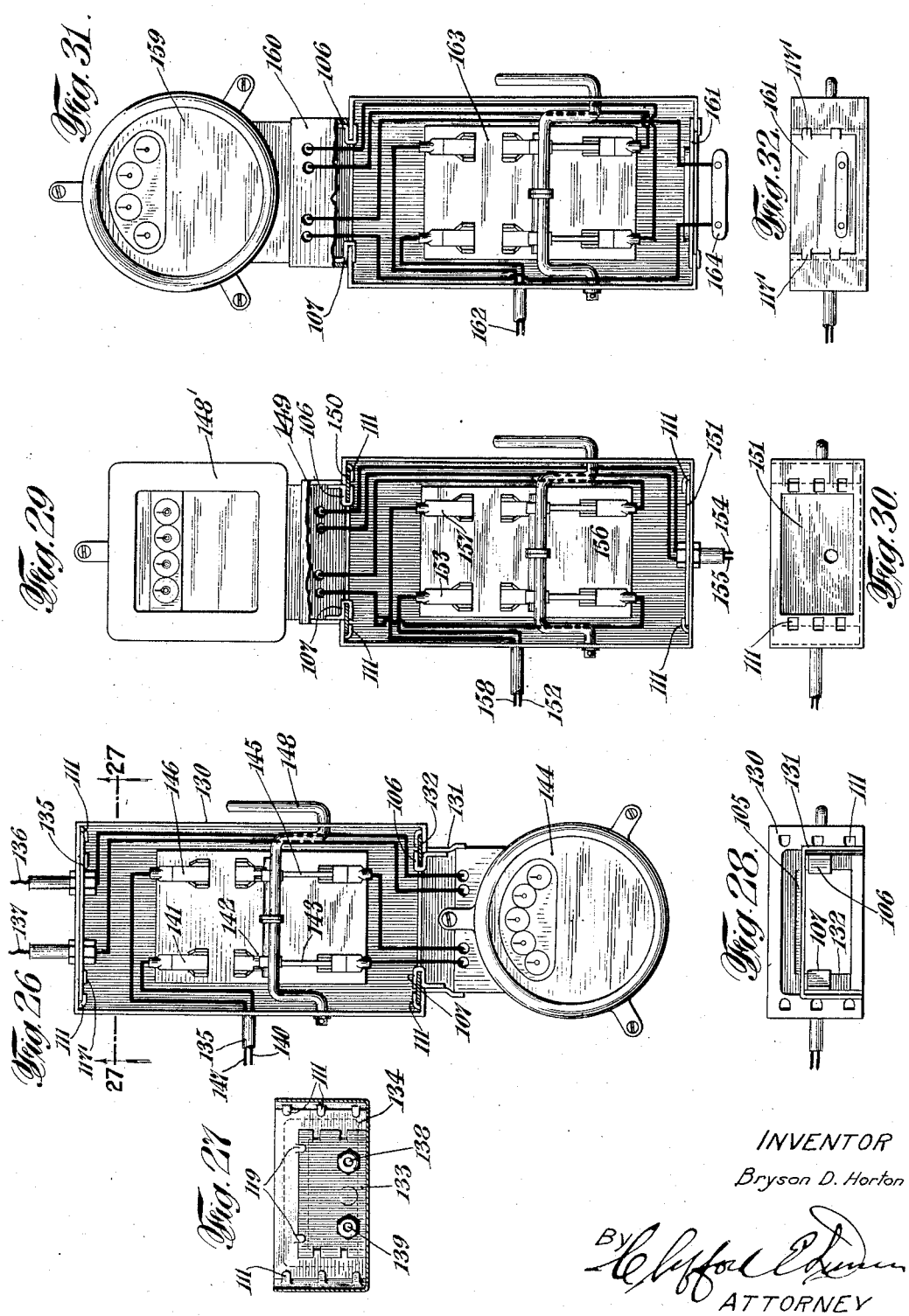
INVENTOR
Bryson D. Horton
BY
ATTORNEY May 10, 1927.
B. D. HORTON
1,628,406
SERVICE SWITCH AND APPURTENANT PROTECTIVE FITTING
Original Filed March 26, 1919   8 Sheets-Sheet 6
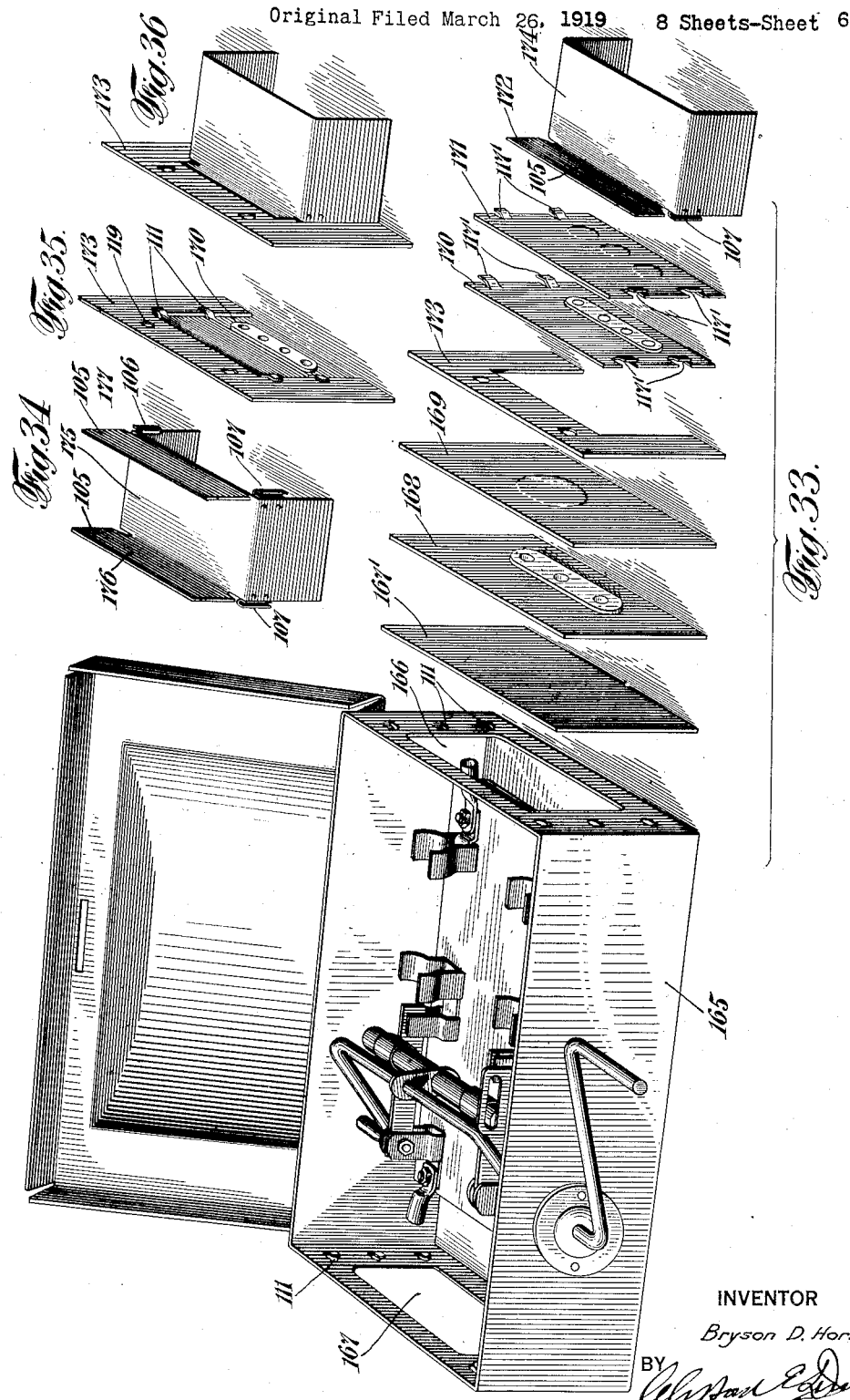
INVENTOR
Bryson D. Horton
BY
ATTORNEY May 10, 1927.
B. D. HORTON
1,628,406
SERVICE SWITCH AND APPURTENANT PROTECTIVE FITTING
Original Filed March 26, 1919
8 Sheets-Sheet 7
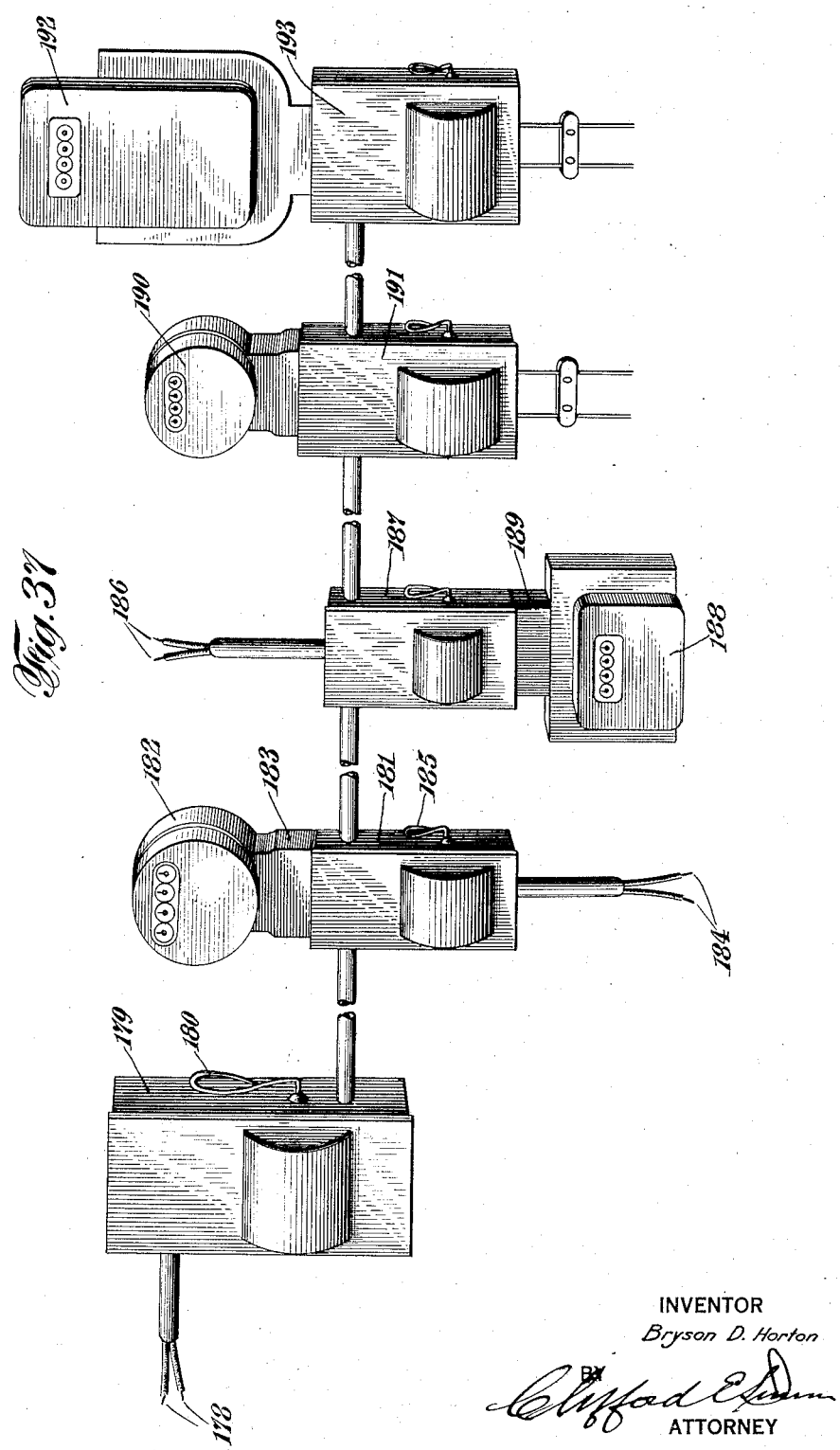
INVENTOR
Bryson D. Horton
BY
ATTORNEY May 10, 1927.
B. D. HORTON
1,628,406
SERVICE SWITCH AND APPURTENANT PROTECTIVE FITTING
Original Filed March 26, 1919    8 Sheets-Sheet 8
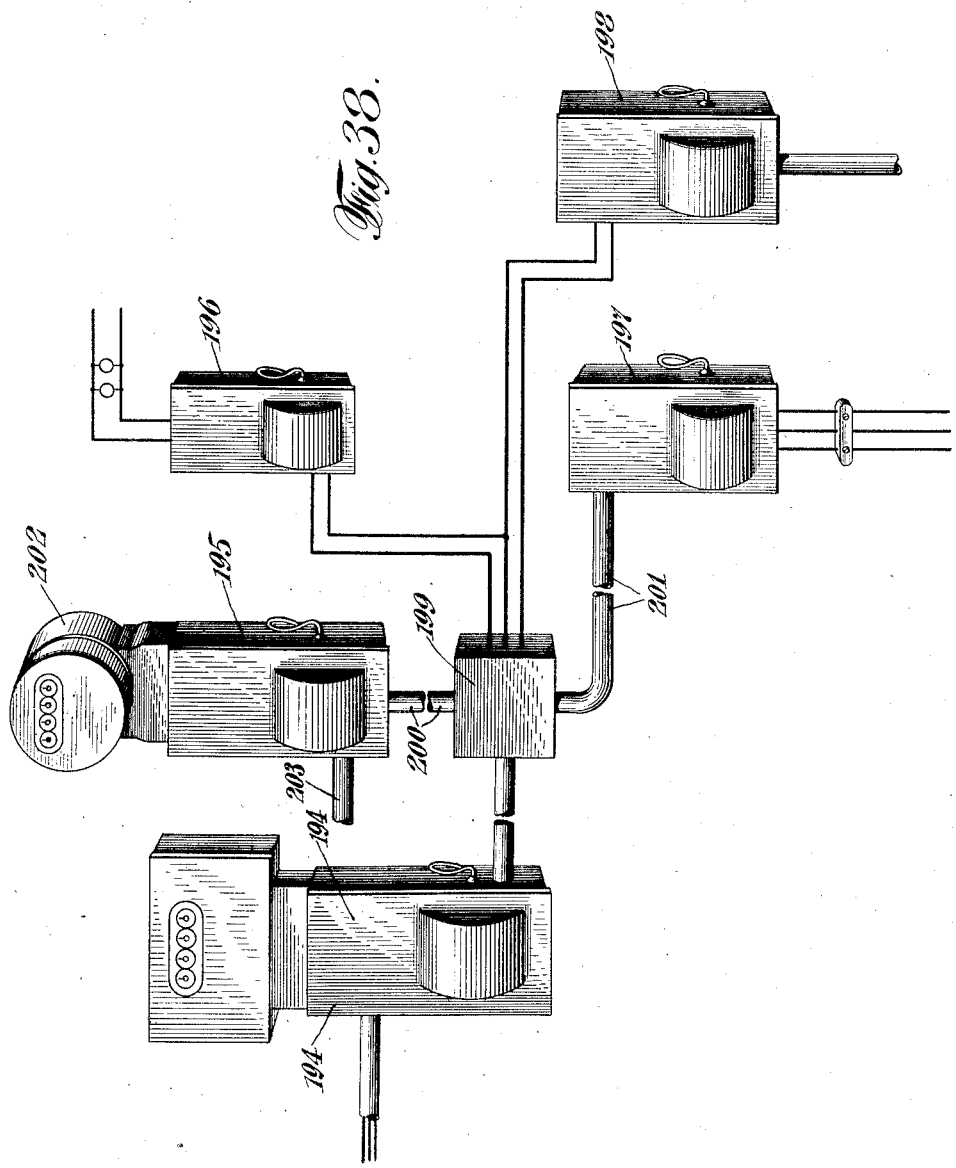
INVENTOR
Bryson D. Horton
BY
ATTORNEY Patented May 10, 1927.

1,628,406

UNITED STATES PATENT OFFICE.

BRYSON D. HORTON, OF DETROIT, MICHIGAN, ASSIGNOR TO SQUARE D COMPANY, OF DETROIT, MICHIGAN, A CORPORATION OF MICHIGAN.

SERVICE SWITCH AND APPURTENANT PROTECTIVE FITTING.

Application filed March 26, 1919, Serial No. 285,269. Renewed September 10, 1926.

This invention relates to service switches and appurtenant protective fittings, and more particularly to a system of protective enclosures for electric distributing systems.

As far as concerns common subject matter, this application is a continuation of my co-pending applications, Serial No. 29,738 filed May 22, 1915, and entitled "Metal boxes or receptacles for electric switches," and Serial No. 3703, filed January 22, 1915, entitled "Electrical switches".

Service switches and their associated meters for measuring the power delivered to the customers, as well as the necessary wiring used for interconnecting purposes, are according to the best practices of the art, encased in proper housings to eliminate all possibility of tampering with the connections and apparatus enclosed in the housings. This reduces the probability of theft of power and minimizes the element of hazard present in the handling of high potential currents. Consequently a large variety of enclosed service switch housing structures and associated fittings, known in the art as meter adapters for interlocking the housings with the meter in ironclad union, have been developed and are being used commercially. The housings or enclosures used for the service switches are constructed with suitable knock-outs, porcelains and other like appliances to permit of the wiring of the switch confined within the housing to the external service and load circuits. The service switches are also equipped with suitable means whereby said switches can be operated from the exterior of the housing without opening the cover, thus permitting the locking of the housing against those who are not qualified to have access to the switch and meter connections, but permitting at all times control, by the customer or attendant, of the flow of current to the load circuit, this control being possible without opening the switch housing. Obviously the size of the service switch housings vary in accordance with the size of the switch utilized, which in turn depends upon the current or the power delivered. Likewise the meters used with the switch housings or enclosures vary in size and configuration, depending respectively upon the capacity and type of the meter which is to be used. In a like manner the type of openings used with the housings to permit the entry of the service and load conductors varies with the kind of wire installation with which the service switch housing or box is to be used, as, for example, whether it is open wiring or concealed wiring. Thus the switch box or housing must be arranged to accommodate the particular kind of wiring with which it is to be used, and must consequently be fitted with either knock-outs or porcelains or both.

Because of these varying demands of service, as to the capacity of the installation and the different kinds and types of electric wiring used commercially, a very large number of different designs of service switch housings and their appurtenant fittings to enclose the wiring and apparatus in a protective casing, are required to meet the demands of the trade. Each particular housing and its associated fittings is individual to the specific requirements as to currrent-carying capacity of the service switch mounted therein, and the kind of wiring with which it is to be used. It follows, therefore, that the manufacturer, contractor and jobber, in order to be able to meet the varying requirements of the trade, must carry in stock not only the service switch housings or boxes of the different current-carrying capacities desired, but likewise a tremendous assortment of meter-adapters arranged to fit not only the meters of varying configurations but also to fit the boxes or enclosures for the service switches of different capacities. It has been also necessary, therefore, to carry for the boxes of varying capacities, equipment to meet the different types and character of external wiring. It is further necessary to be able to place the meter at either end of the service switch housing. For this reason, the ends of these housings have generally been apertured, and these apertures in the completed structural combination have been fitted at one end with the meter-adapter and at the other end with an end-plate provided with the desired wire or conduit fittings, porcelains or knock-outs respectively. Obviously the sizes of the apertures for these end-plates vary in accordance with the capacity of the housing, and end-plates equipped with all of the various types of knock-outs and porcelain fittings, large and small, must be provided for each size of box.

This resulted in the maintenance of a very large stock, which was inflexible, and in which each complete commercial combination of service switch housing, meter adapter and wire fitting or receiving end-plate, had to be kept on the shelves if it was desired to be in a position to supply from stock any and all commercial demands.

It is one of the objects of this invention to provide a system of improved service switch housings, meter adapters and end-plates fitted with knock-outs and porcelains, which constitute units that can be assembled in any desired combination to meet any desired commercial specification and requirement. In other words, it is one of the purposes of this invention to provide a system in which the service switch housing units, meter-adapters and end-plates, are fitted with standardized means so that they can be united into a combined protective casing, irrespective of the capacity of the service switch housing and the size or characteristics of the meter-adapters and end-plates utilized. That is, the service switch housings of the various capacities, are standardized, basic units, with any one of which it is possible to combine any type of meter adapter and any type and character of end-plate of any size equal to and smaller than the size of the end-plate utilized for the maximum current-carrying capacity of the housing. As will be evident from the following detailed description, the system is composed of a plurality of interfitting, readily interchangeable units, of the same or different capacities and characteristics, any of which can be assembled into a complete structure of any desired character by the interfitting, combining and association of any desired group of particular units, the combined unit comprising as an entity a protective casing for the wiring and apparatus.

The standardization of the units into a system of interchangeable, interfitting parts, adapted to be united in any desired combination of protective casing, results in many advantages, some of the principal ones of which consist in, first, the great reduction in the stock that must be carried by the jobber, contractor or manufacturer in order to meet all the varying demands of his trade; second, the flexibility of a system of operating units whereby the fittings, such as meter-adapters or hoods and end-plates, can be interchanged with a minimum amount of effort and without lose of aparatus, whenever, due to operating conditions, such changes become necessary; third, the adaptability of the apparatus to the tempory installation of meters in protective casings for accounting or checking purposes, with a minimum effort and without loss of equipment; thus, for example, the temporary replacement of a standard meter by a recording meter for the determination of maximum and average loads; and many other advantages which will arise due to the flexibility of the system, whereby all the continually varying conditions of commercial operation are quickly and economically met.

Another object of this invention resides in an improved meter-adapter and in standardized meter-adapter interconnecting means A further object resides in an improved means whereby the fittings for the standardized basic service switch unit can be interfitted with any basic switch unit of the same or of larger capacity.

Another object consists in the improved form of standardized protective casing unit, provided with improved means for interconnecting the appartus and wiring fittings.

Other objects of the invention will become apparent from the following description and the appended claims.

For the purposes of description, one form of the invention is illustrated in the accompanying drawings, in which;

Figure 1 is a plan view of one form of switch mechanism and the improved standardized basic switch enclosure or casing, the cover of the casing being open to show more clearly the arrangement of the switch mechanism;

Figure 2 is an illustration partly in section, taken on the plane represented by the line 2—2 of Figure 1, looking in the direction of the arrows;

Figure 3 is an illustration in vertical section taken on the plane represented by the line 3—3 of Figure 1, the view being taken with the cover in closed position;

Figure 4 is a detail and side elevation of the operating handle and oscillating spring-actuated mechanism, which functions to cause an abrupt and quick break between the switch contacts;

Figure 5 illustrates in perspective the connecting mechanism between the operating crank and the movable switch contact actuator-bar;

Figure 6 is an illustration in perspective of the connecting element between the actuator-bar and the movable blade of the switch;

Figure 7 is a similar view of a modified form of such connecting device;

Figures 8, 9 and 10, are detail illustrations of forms of switch contacts and fuse-clip supports;

Figure 11 is an illustration in perspective of a two-compartment standardized basic service switch housing or enclosure fitted with apertures which cooperate with end-plates and with meter-adapters of various sizes and configurations;

Figure 12 is a fragmentary detail illustration in end elevation;

Figure 13 is a similar detail illustration showing the manner in which the covers or lids of the casing or housing are constructed and mounted;

Figure 14 is a perspective detail illustration of a fragmentary part of the switch casing, and illustrates one method of interlocking or connecting the meter-adapter with the apertured end of the switch enclosure, the interconnection in this illustration being accomplished through the medium of an aperture-restricting plate;

Figure 15 is a similar illustration in which the meter-adapter is connected or interlocked to a switch enclosure directly and without the use of an aperture-restricting plate;

Figure 16 is a view similar to Figure 15, and illustrates a different form of meter-adapter and a different method of directly interconnecting or interlocking the meter-adapted with a switch enclosure or housing;

Figure 17 is a perspective detail illustration of a fragmentary part of the service switch housing, and illustrates the method of interlocking removable end-plates provided with knock-outs with the service switch enclosure, the end-plate being connected to the enclosure through the medium of an aperture-restricting plate;

Figure 18 is a similar view showing the end-plate equipped with a porcelain bushing which is utilized when open wiring is used exterior to the switch casing;

Figure 19 is a like view and illustrates an end-plate fitted with a knock-out and connected to the service switch enclosure without the use of an aperture-restricting plate.

Figure 20 is a like view illustrating the preferred standard form of interconnection between the end-plate and the service switch housing of minimum capacity;

Figures 21 to 25 inclusive illustrate meter-adapters arranged to receive meters of different forms and configurations, the adapters being fitted with switch housing interlocking or connecting means, of standardized and uniform character and size;

Figure 26 is an illustration, partly in section and with the cover removed, of a complete protective casing or enclosure for the service switch and the associated wiring, the service switch being of a capacity greater than the minimum capacity of switch and housing constructed;

Figure 27 is a sectional view taken on the plane indicated by the line 27—27 of Figure 26, looking in the direction of the arrows;

Figure 28 is an end illustration of the service switch enclosure and associated meter-adapter, with the meter removed;

Figure 29 is an illustration of another service switch and its protective enclosure, end-plate and meter-adapter, of different capacity, and provided with a meter of different configuration and end-plate of different character from that shown in Figure 26;

Figure 30 is a lower end view of the enclosure shown in Figure 29;

Figure 31 is an illustration of the minimum capacity service switch and cooperating protective enclosure, together with the cooperating meter-adapter and wiring end-plate, the wiring end-plate being provided with a porcelain fitting;

Figure 32 is a lower end view of the service switch enclosure illustrated in Figure 31;

Figure 33 illustrates in perspective a service switch and cooperating basic standardized service switch housing or enclosure, together with a plurality of end-plates, a meter-adapter and an aperture-restricting plate which may be combined in desired combinations with the standardized switch enclosures;

Figure 34 illustrates an interconnecting housing which may be interchangeably connected between two service switch enclosures, a service switch enclosure and a meter, or in any other combination, and functions as a protective extending trough or channel between the elements which it interconnects;

Figure 35 shows the method of interconnecting an end-plate of small size with an aperture-restricting means so that the end-plate of small size can be suitably interconnected with a protective switch housing of large capacity;

Figure 36 is a similar view illustrating the method of interconnecting a meter-adapter with an aperture-restricting plate for the purpose of connecting the meter-adapter to a switch enclosure of large capacity;

Figure 37 illustrates the method of installing the basic standardized service switch enclosure, with its appurtenant fittings, in a system designed to deliver current or power to a plurality of customers in an apartment or loft building, in which each customer's load is individually measured. The illustration shows the service switch boxes or housings interconnected with meters of varying configuration, and adapted to exterior wiring of both the open wire and enclosed type, and Figure 38 is a typical illustration of a system using standardized units in a power distributing system for a factory or other similar system in which the load delivered to the various circuits is measured as a whole at the initial service switch box at which the power enters the building and in which the service switch boxes throughout the building are fitted with end-plates adapted to meet the various characteristics of wiring utilized. The service switch boxes used in this system are also adapted to be fitted with individual meters for each box whenever the demands of service require such installation.

The cooperating parts of the form of service switch and its protective enclosure will first be described in connection with Figures 1 to 10 inclusive. As there illustrated, it will be observed that the stationary and movable contacts are mounted upon a base 40 constructed of any suitable type of insulating material, which in turn is fastened by any suitable form of interconnecting means, such as 41, to the base 42 of a metallic housing, the housing being provided with a hinged lid or cover 43. The stationary contacts 44 are of the jaw type and are provided with fuse clips 45 which may be of integral construction. These stationary contacts and fuse-clips obviously may be made of individual single stampings and bent into form as illustrated in Figure 8. To accommodate the other end of the fuse the base 40 is fitted with the cooperating fuse-clips 46. These fuse-clips are equipped with wire-receiving sleeves 47 which may be formed integrally with the fuse-clips, thus constituting a unitary construction made from a single sheet-metal stamping, as illustrated specifically in Figure 9. Cooperating with the jaw contacts 44 are knife-blades 48, these knife-blades being pivotally mounted at 49 in a jaw-like support 50. The support 50 is provided with wire-receiving sleeve 51, which may be formed integral with the support 50, as specifically illustrated in Figure 10.

The movable blade contacts 48 are operated by a cross-bar or actuator-member 53, this actuator-member being either formed of insulating material throughout or constructed of a metallic bar enveloped by insulating sleeves 54. The actuator-bar is connected to the knife-blade contacts 48 by means of a connecting device 55, which is clearly illustrated in detail in Figure 6. This connecting device is preferably made from a single sheet of metal, formed with a portion 56 conforming to the general contour of the actuator member 53, thus providing a seat therefor and a depending part 57 to which the knife-blade contact is riveted by suitable rivets such as 58. In order to provide a positive connection between the actuator-bar and the connecting device a screw-bolt 59 is provided which serves to clamp the actuator-bar securely in the connecting device.

Obviously this connecting device may take a large variety of forms, a two-piece device in modified form being illustrated in Figure 7, in which the part 57' is entirely separate from the part 56', the two parts being joined and interconnected by means of a screw 60 which also serves the additional function of tightening the enveloping part of the connector 56 to the actuator-bar. In order to prevent lateral displacement of the two parts, the lower free end of the part 56' is bent downwardly on its edge at 61 to form a rectangular abutment, which abutment, when the parts are tightly screwed together, prevents relative rotary movement therebetween.

The movable contacts or blades 48 of the switch are actuated by a crank 62, which is mounted in the sides of the casing at a point substantially in alignment with the pivotal mounting of the switch blades 48, thereby providing for a substantial throw or swing of the movable contacts within a given limited space. The crank 62 is connected with the cross-bar or actuator-member 53 through the medium of a two-piece connector member 63, which comprises two metallic parts provided with jaw or cut-out portions 64, oppositely disposed one to the other so as to confine the actuator-bar within the parts. The parts are held together by a bolt which fits in the aperture 65. Both parts are provided with apertures 66, which are slid or slipped upon the crank 62 and serve as the interconnecting means between the crank and the two-piece connecting member 63. One end of the crank 62 is held in its bearing by a washer 67 and a cotter-pin 68. The opposite bearing end of the crank shaft is mounted within two cup-shaped bearing members 69, riveted to the interior and the exterior sides of the casing as clearly illustrated in Figure 1.

In order to provide for the throw of the crank to manipulate the switch mechanism, an exterior handle 70 is provided. This handle is of one-piece construction and made from a piece of tubing slotted at 71 and swedged into an intermediate flat portion 72, and provided with curved end portions 73, the latter taking the conformation of the operating crank and surrounding and having a bearing thereon. A bolt 74 serves to hold the parts together but this interconnection is not sufficiently tight to prevent the handle from oscillating upon its bearing to a limited extent to provide for the proper manipulation of the switch.

In order to provide for a quick and rapid break between the switch contacts, which is desirable in order to minimize arcing, an accelerating mechanism is provided in which the power of a spring is utilized to exert a force upon the crank to aid it in its movement, and thereby making more rapid the break between the switch contacts. This feature of the invention comprises a curved rod 75 which is riveted and held in place to the operating handle 70 at 76. This rod is mounted to reciprocate through an aperture in the extreme upper end of the bent-up portion of the operating handle. Surrounding the rod 75 and held between the bent-up portion 77 of the handle and a washer 78, is a spring 79 which is compressed when the handle 70 is operated to break the connection between the contacts, as will be more fully hereinafter explained.

Thus if it be assumed that the contacts be in their closed position, it will follow that inasmuch as the curved rod 75 moves with the handle 70, and since the latter is free to rotate on the bearing end of the crank 62, and the curved rod 75 is free to slide through the aperture in the upper end of the bent-up portion of the handle, the crank 62 will not begin to move until the confined spring 79 is compressed between the washer 78 and the curved end 77 of the crank 62 sufficiently to overcome the frictional grip between the fixed and movable contacts of the switch. As soon as this is accomplished the spring expends its stored energy and power and exerts it against the operating crank 62, causing it to swing abruptly to break the connection between the contacts.

The switch mechanism is also provided with means to lock it in its off position. For this purpose the cover is provided with an enlargement 80 for the accommodation of the movable blade contacts 48 when thrown to their off position. The movement of the crank is limited by a plate 81 which is rivetted to the under side of the cover. This plate is provided with a depending extension 82 which is equipped with a notch 83 of a sufficient size to accommodate the crank 62 so that when the cover is open and the crank is moved to the extreme end of its contact-breaking position, and the cover thereafter closed, the crank will seat within the notch 83 and thus prevent moving of the crank and its associated blade contacts to the switch contact closing position.

In order to provide for convenient wiring of the switch to the exterior circuits, the ends of the casing are apertured at 84 and 85. The apertured end 84 is arranged to receive any desired wiring or meter fitting but in the illustration shown in Figures 1 and 3 is closed by a plate 86 provided with knock-out portions 87 which may be of any desired number. This plate is slidably, removably and interchangeably connected with the switch enclosure by means of cooperating fingers or tangs 87' secured to the end wall of the switch enclosure, and may consequently be withdrawn from the casing whenever desired as for example when it is desired to remove or knock out the knock-out portions 87 preparatory to the wiring of the switch. The opposite apertured end 85 of the switch enclosure is likewise provided with a removable end-plate 88, and in the specific illustration in Figures 1, 2 and 3, this end-plate 88 is provided with an oblong slot in which is mounted a porcelain bushing 88' provided with suitable holes 89 which conform in size to the particular size of wires that are employed in wiring the switch. This plate 88' is likewise slidably, removably and interchangeably connected with the switch enclosure by means of cooperating fingers or tangs 87'.

Referring now to Figures 11 to 13 respectively, it will be observed that the two-compartment there shown is formed, and preferably so, with a body portion 90 made of a single sheet of metal and provided with a dividing wall 91 made of a single sheet of metal, which separates the enclosure into two separate compartments. The compartments are closed by separate hinged lids 92 and 93 each of which are preferably made from a single piece of sheet metal. The lids are provided with extending ears 94 and 95 which have a common pivotal means 96 which connects them to the body of the casing and constitutes a hinge by means of which they may be independently moved to open or close the respective compartments of the enclosure which they cover. In order that the lids may be opened simultaneously and to an extent sufficient to permit ready access to either compartment, it is necessary to cut away part of the metal inwardly from the pivoted ears thereby allowing the lids to swing toward each other as illustrated in Figure 1. When the lids are in closed position their adjacent edges are removed from each other thereby leaving an intervening space, which, if left uncovered would present an opening through which foreign matter, such as water, dust or dirt might enter the compartments of the switch enclosure and seriously interfere with the proper working of the switch. Likewise, tampering with the switch and the connections within the enclosure might be accomplished through such opening. In order to completely close the top of the enclosure and at the same time permit the lids or covers 92 and 93 to be opened simultaneously to the extent desired, the partition 91 is provided with a laterally extending flanged portion 97, having its longitudinal center portion pressed downwardly as at 98 to an extent sufficiently so that the upper plane of this portion 98 will lie in the same plane as the top surfaces of the adjacent lids 92 and 93.

In order to render the switch compartments easily accessible for the introduction of wire conductors, the side-walls thereof are provided with a series of knock-outs, such as 99, the knock-outs of each series being preferably in alignment with those of the adjacent series, and preferably of the same relative dimensions. The knock-outs in each series may be arranged to fit conduits of various sizes, that is, making the knock-outs in each series vary as to size. In order to allow for the convenient wiring of the electrical units of the two compartments, removable separate knock-out plates, such as 100, or integrally formed knock-outs 101, or bushed openings fitted with grommets 102, are provided, the latter serving to present a smooth contact surface to the insulation of the entering conductor.

In order to adapt the two-compartment switch enclosure for cooperative association with a standard system utilizing the various forms of end wiring plates or meter adapters, one or both compartments of the housing may be provided with apertured ends similar to that shown for one of said compartments in Figure 1 at 103, and also illustrated generally in Figures 14 to 20 inclusive. These apertured ends, as illustrated in these drawings, may be closed either by a removable end-plate fitted with wire inlets as shown in Figures 11 and 17 to 20 inclusive, or they may be closed by being fitted with meter-adapters as illustrated in Figures 14 to 16 inclusive. Obviously the meter adapters used with the switch enclosure or housings may assume any form, shape or type, the meter adapters shown in the drawings being illustrative merely of one embodiment thereof. Thus meter adapters of a radically different design and construction could be utilized, provided they function to close the opening or gap between the meter and switch housing so that the combined housing and adapter constitutes a complete protective structural housing or enclosure, and provided the adapter be equipped with both, standardized fittings for interconnection with the standardized connecting means in the switch housing, and fittings of various shapes and configuration conforming to the shapes and configurations of the different types of meters which are used.

Referring specifically to these figures, the interchangeability of the end-plates and meter adapters with switch enclosures of various sizes, conforming to the capacity of the switch which is mounted in the enclosure, will be readily apparent. Thus the aperture shown in Figure 11, or the apertured openings shown in Figures 14 to 20 inclusive, may be closed either by a removable end-plate such as is shown in any of these figures, provided the end plate is of a size to cooperate with the aperture, or by any of the meter-adapters shown in the figures. The meter-adapters are provided with an interfitting connection, for interlocking them with the service switch housing, which is of uniform and standard size, irrespective of the configuration of the portion of the adapter which fits around the meter proper. This standardized interfitting end of the meter-adapter is made of a size which will fit the aperture positioned in the switch enclosure capable of receiving the service switch of minimum current-carrying capacity. A meter-adapter connected with a service switch enclosure of this minimum capacity is illustrated in Figures 15 and 16, Figure 16 showing the preferable form of interconnecting the meter-adapter with the switch enclosure, and Fig. 15 illustrating a modified form thereof.

The end plate utilized for the entry of the wires to the switch enclosure for a box of minimum current capacity, is illustrated in Figure 20. The end-plate for a box of larger size is illustrated in Figure 19, in which case the plate is made of a size sufficiently large to cover the larger aperture with which the enclosing structure for the service switch is equipped. When it is desired to equip a large capacity switch enclosure with a meter-adapter or with an end-plate of a size smaller than that utilized for the ultimate capacity of the switch enclosure, then the end-plate of smaller capacity and the meter-adapter are combined with an aperture-restricting means or medium which serves to interconnect the smaller-sized meter interconnecting means or the smaller-sized end-plate with the larger aperture of the larger capacity enclosure. The method of utilizing the aperture-restricting plate with the meter-adapter is illustrated in Figure 14, and the use of end-plates with the aperture-restricting means is illustrated in Figures 17 and 18.

It will be evident from what has just been said that any size or character of end-plate of a size smaller than the size of plate used for the ultimate capacity of the switch enclosure, and a meter-adapter of any type or configuration may be used with any service switch enclosure. Through the instrumentality of these interchangeable plates and adapters it is therefore possible to install a switch-enclosure of the standardized type and of a given size, and as said switch and enclosure can be used with any type of meter-adapter and any type of end-plate, it is unnecessary thereafter to remove the switch or the switch enclosure when, due to growth or expansion in the service, or for any other reason, it becomes necessary to install a larger or different meter or change the character of the wiring utilized in the installation. Under these circumstances, with this standardized system of interchangeable parts, it is merely necessary in order to take care of the growth, to substitute the desired meters with proper meter-adapters, and utilize the proper form of end-plates for wiring, said meter-adapters and end plates being readily adjusted to fit any size of switch enclosure opening through the medium of the aperture reducing plate.

Referring now specifically to Fig. 14, it will be observed that the meter-adapter 104 is provided at its upper end with a forwardly extending flange 105 and with lateral flanges or clips 106 and 107. These flanges serve to cooperate with the reducing, constricting or restricting plate 109 and interconnect the meter-adapter 104 to the said reducing plate, the upper vertical edge 109 of the meter-adapter, together with the flanges 105, 106 and 107, serving to rigidly hold the meter-adapter to the aperture-reducing plate 109. The end wall 110 of the switch enclosure is fitted with a series of tangs or fingers, such as 111, which serve to hold the reducing plate, 109 in place when slid in between the end wall 110 of the switch enclosure and the tangs 111. The meter adapter 104 is therefore, in the particular illustration shown in Figure 14, held in slidable, interchangeable connection with the end wall 110 of the service switch enclosure by means of the tangs 111 which hold the reducing plate 109 in position.

All meter adapters are provided with flanges such as 105, 106 and 107, which fit into a standardized aperture opening of the size illustrated in Figure 14. This size aperture is the one utilized with a switch enclosure of minimum current capacity. See Figures 16 and 20. When the adapter is to be used with an enclosure for a service switch of larger capacity, in which the end walls are fitted with larger apertures, it is necessary to reduce the apertures of the end walls of said enclosure by means of an aperture-reducing plate, such as 109, illustrated in Figure 14.

In Figure 15 a meter-adapter 112 is fitted with a different form of interconnecting means, the adapter in this case being equipped with the side-flanges 113 and 114 which cooperate with the end wall 110 of the service switch enclosure and with the tangs or gripping fingers such as 115. This is a modified structure to illustrate a varying form of interconnection between the meter-adapter and the switch enclosure. The preferred form of connection is shown in Figure 14 and Figure 16. Obviously a large variety of other and different forms of interconnecting means can be readily devised by anyone skilled in the art and this invention is not limited to the specific forms herein illustrated and described.

Figure 16 shows the method of connecting a different form of meter-adapter, 116, with a service switch enclosure of minimum capacity, in which the end wall of the service switch enclosure 110 is apertured to receive the flanges 105, 106 and 107 of the standard size for meter adapters. If the meter-adapter 116 was to be used with a larger sized service switch enclosure, of the type illustrated in Figure 14, then this meter-adapter 116 would be united in cooperative relationship with an aperture-reducing plate 109, after which the meter-adapter of the type shown in Figure 116 could be slidably and interchangeably inserted in the larger size aperture in the end-wall 110 of the service switch illustrated in Figure 14.

In a like manner the end-plates which carry the desired type of wire fittings, are connected to the apertures in the walls of the service switch enclosure. Thus in Figure 20 the end-wall 110 is apertured to receive the minimum-sized end-plate 117. These end-plates may obviously be fitted with any desired type of wiring means, such as the knockouts shown on the end-plate illustrated in Figure 20, or with any type of porcelain wire fittings of the character illustrated in Figure 18, or any other form desired. The end wiring plate of minimum capacity, 117, is fitted at both ends with a series of tangs or projections 117' which are struck downwardly and spaced away from the main body of the end plate, the separation between the tangs and the main body of the plate being sufficient to admit another plate, or the end-wall 110 of the service switch enclosure. When the end-plate is thus slipped into place with the tangs on the opposite sides of the end-wall from the main body of the plate, the end-plate is positively held in position in said end-wall.

Figures 17 and 18 show the method of attaching the adapter plate to a service switch box where the aperture in the wall of the box is larger than the size of the end plate, in other words, in which the capacity of the service switch enclosed in the box is greater than the capacity of the minimum sized switch utilized in this system or combination. When a plate of this size is to be used in a box which is fitted with apertures of the larger size, an aperture-restricting plate 109 is fitted in place in the end-wall 110 of the service switch enclosure, between the end-wall and the tangs or gripping finger 111 struck up from the end-wall of the enclosure. The aperture-constricting plate is also fitted with the projections 119 struck up from the body of the plate, these projections functioning to limit the movement of the aperture-reducing plate 109. The end-wiring plates 120 and 121 are then fitted into the aperture-restricting plate 109, by holding the end plates 120 or 121 in position in back of the aperture and then sliding the restricting plate 109 into position between the end wall 110 and tangs 111, the restricting plate at the same time positioning between the tangs 117 and the body of the end-plate.

Figure 19 illustrates a larger-sized end-plate 123, which is utilized with boxes of larger capacity for admitting larger-sized conductors, and in which the plate is formed of a size to completely close the larger-sized apertures in the walls of the larger capacity box. These larger-sized plates are provided with tangs 119' and are held in position in the end-wall of the switch enclosure by the inwardly projecting tangs or gripping fingers 111 struck up from the said wall, as clearly illustrated in Figure 19.

From the preceding description it will be evident that whenever the cover of a service switch enclosure is closed, it will hold in place whatever fittings are used in the apertures of the walls of the enclosure. See Figs. 3 and 11.

Obviously a large variety of different methods of interconnecting the meter-adapters and wiring end-plates to the service switch housings can be constructed, and this invention is not limited to any specific form, the preferred form shown in the drawings being illustrative only.

Referring now to Figures 21 to 25 respectively, in which a plurality of meter-adapters are illustrated, it will be noted that each meter-adapter is fitted with a forwardly projecting interconnecting plate 124, all of which are uniform in size and adapted to be interconnected with a service switch enclosing box of minimum capacity. This standardized interconnecting means is associated with meter trims of various characters, such as illustrated at 125 in Figure 21, 126 in Figure 22, 127 in Figure 23, 128 in Figure 24 and 129 in Figure 25. Obviously due to the standard form of interconnection associated with each one of these various forms of meter trim, it is possible to interconnect any one of these meter-adapters directly with any service switch box of minimum capacity, and it is likewise possible to interconnect any of these meter-adapters with service switch enclosures of any other capacity larger than the minimum capacity by utilizing an aperture restricting plate 109 of the type illustrated in Figure 14.

Meter-adapters of the configuration shown in Figures 21 to 25 inclusive, and of any other desired form, the type shown in the aforesaid figures being merely illustrative of how a meter-adapter of any configuration may be associated with a standard interconnecting means, can consequently be slidably and interchangeably interlocked in iron-clad union with any type or capacity of service switch enclosing housing.

Referring now to Figures 26, 27 and 28, which show a service switch enclosure 130 of a capacity larger than the minimum capacity of enclosure used in this system, it will be observed that the meter-adapter shown at 131 is interconnected with the switch enclosure by means of an aperture-restricting plate 132, and likewise the end-plate 133 carrying suitable knock-outs, is connected to the end-wall of the enclosure through the medium of the aperture-restricting plate 134. The end-plate 133 is interlocked with the aperture-restricting plate 134 by means of the tangs and associated fittings illustrated and hereinbefore described in connection with Figures 17 and 18.

Figure 26 shows the protective enclosure for the wiring of a meter and its associated service switch in complete form, the service circuit entering by means of a conduit 135 which is fitted in a suitable knock-out in the side-wall of the box. The load-conductors 136 and 137 are wired into the box through the knock-outs 138 and 139 fitted in the end-plate 133. The circuit from the service side through the meter and service switch to the load side, may be traced as follows: From the positive service conductor 140 to the fuse-clip 141, through a suitable fuse to the switch contact 142, the blade of the switch 143, and from the blade 143 of the switch through the current coil of the meter 144, and thence out to the load conductor 136, through the load, back through the conductor 137 to a link in the meter 144, and thence through the blade contact 145 to fuse contact 146, and through the fuse contact 146 to the other service lead 147.

It will be noted that the conductors utilized in interconnecting the service switch to the meter are enclosed in the meter-adapter 131, and that all the connections are enclosed in a protective housing or enclosure. The blades 143 and 145 of the service switch may be operated from the exterior of the housing when the housing is closed by means of the operating handle 148. Likewise when the cover of the housing is locked in position, the meter-adapter 131 and the end-plate 133 will be permanently locked in position by said cover, the cover of the housing fitting over the top edges of the meter-adapter and the wiring end-plates.

Figure 29 illustrates another complete protective enclosure for a meter-adapter and externally operated service switch in which the meter 148' is of different configuration. The capacity of the enclosure shown in Figure 29 is also larger than the capacity of the minimum size switch enclosure made, and consequently in order that the standard interconnecting meter-adapter means may be adapted to this switch enclosure, it is necessary to connect the said meter-adapter 149 to the end-wall of the switch enclosure by means of an aperture-reducing plate 150. The end-plate admitting the wires from the load circuit to the service switch, which is used in connection with the enclosure illustrated in this figure, is one which is designed for the particular capacity of this enclosure. This end-plate is illustrated at 151, and, as will be observed, is a flat plate which completely covers the aperture in the end-wall of the service box and is held in position over said aperture by tangs 111 similar to those illustrated in Figure 19. The method of placing this plate in position and holding it in place has been hereinbefore described in connection with the detailed description of Figure 19. The meter-adapter 149 and the end-plate 151 when placed in position in the switch enclosure are permanently locked in said position by means of the cover of the switch enclosure in a manner identical to that described in connection with Figure 26.

The circuit connections for the switch and meter illustrated in Figure 29 may be now briefly traced as follows: From the service lead 152 to the switch terminal 153, through the switch to the current coil of the meter 148, through the current coil of the meter to the load conductor 154, through the load and back over the load conductor 155, thence to the link in the meter and from there to the switch contact 156 and the fuse contact 157 to the other service conductor 158.

Figure 31 illustrates a service switch enclosure designed for the minimum size of externally operated service switch which is utilized in this system. This service switch enclosure, as will be evident from a comparison of Figures 28, 30 and 32, is considerably shallower than the enclosure or box illustrated in Figures 28 and 30. In this case the meter 159 is interconnected to the switch enclosure directly by means of a meter-adapter 160, no aperture-restricting means being necessary for this interconnection, and likewise the end wiring plate 161 is directly connected to the other end of the service switch enclosure without the use of an aperture restricting plate. The plate 161 is the smallest-sized plate which is used with switch enclosures, and if it is desired to use this size plate with a switch enclosure of the type illustrated in Figures 26 or 29, it is necessary in order that it may be properly fitted in the end-wall aperture, to unite it with an aperture-restricting means.

The circuit connections between the service circuit shown at 162, the switch 163, the meter 159 and the load circuit 164, are so similar to those described in connection with Figures 26 and 29 that further detailed tracing of this circuit seems unnecessary.

It will be evident from what has preceded, that any of the meters illustrated in either of the three figures, 26, 29 and 31, can be interchangeably connected with any one of the switch enclosures there shown, and that any of the end-plates shown in either of these figures or in Figures 17 to 20 inclusive, can be connected with any of said switch enclosures providing the size of the end plate is not larger than the maximum-sized plate used with the particular switch enclosure. Likewise the meter adapters or hoods and the end-plates can be interchangeably connected to either end of the switch enclosure or housing.

This interchangeability of the wiring end plates and meter-adapters and other appurtenances used with switch enclosures is illustrated in perspective in Figure 33. The switch enclosure there shown is one of a capacity larger than the minimum capacity of switch enclosure constructed in this system, and consequently the apertured ends of said enclosure are constructed to receive an end plate of a size larger than the minimum-sized plate utilized in the system. The series of end-plates and the meter-adapter, as well as all the meter-adapters illustrated in Figures 21, 22, 23, 24 and 25, and meter-adapters having any other meter trim configuration, can be interchangeably fitted in the end-wall of the switch enclosure illustrated as a whole at 165. Likewise all of the interchangeable elements shown to the right of the switch enclosure can also be fitted into the aperture shown at the other end of the switch enclosure. Thus the aperture 166 at one end and the aperture 167 at the other end can readily receive either a blank plate 167, which is utilized in the end of the switch enclosure when no wiring enters the enclosure from the end, and when no meter-adapter is connected to that end of the switch enclosure, or either of the wiring end-plates 168 or 169 or end plates of any other type of the same size can be directly connected to this switch enclosure without the use of any aperture restricting means. Likewise if smaller plates of the type illustrated at 170 and 171, or any form of meter-adapter having a standardized and uniform interconnecting means 172, is to be connected with the apertured end wall, this operation can be readily performed by the utilization of an aperture-restricting plate such as 173, which interconnection has been hereinbefore described.

To visualize the association of the small type of end-plate 170 with its restricting plate 173, which increases the size of the plate 170 to that of either the plates 167, 168 and 169, the plate 170 has been fitted with the adapter plate 173 in Figure 35, showing clearly how this combination of plates 170 and 173 increases the size of the plate 170 to the size of either the plates 167, 168 or 169.

In like manner the meter-adapter 174, fitted with the standardized interconnecting means 172, has been combined with the aperture-restricting plate 173 in Figure 36 to show how this combined structural interconnection has increased its size to the size of either the plates 167, 168 or 169, so that the meter-adapter 174, or any other meter-adapter of different configuration so combined can be fitted into the end apertures of the switch enclosures 166 or 167.

Figure 34, illustrating a wire interconnecting trough, gutter or channel 175, is fitted at both ends with the standardized meter interconnecting means 176 and 177. This trough can therefore be directly connected to the minimum sized switch enclosure, and by means of suitable aperture restricting plates connected to a switch enclosing means of any desired larger capacity. The trough interconnecting means is therefore standardized so that it can be used with any type or size of switch enclosure.

Figure 37 shows one type of the commercial application of a power supplying system or circuit in which a plurality of externally operated service switches fitted with their respective meters, meter-adapters and suitable end-plates are used to accommodate the respective wiring of the different load circuits, for a service circuit combination in which each particular load circuit is individually metered. This type of circuit combination is suitable in apartment and loft building installations and in all cases where individual readings of each particular load circuit are desired.

In order to build the protecting enclosing casing for this sort of a system, according to the teachings of this invention, it is merely necessary to select a service switch enclosure of a capacity equal to the load which is to be supplied to the customer, and then by the standardized interfittings hereinbefore described, to fit the desired meter-adapter to one end of said enclosure and the desired wiring end-plate to the other end of said enclosure.

In a system of this character, the service leads 178 are wired into an enclosure containing an externally operated service switch, the said enclosure 179 being fitted at either end with suitable end-plates of the type illustrated at 167 in Figure 33. The service switch is completely encased in a protective housing by means of said end-plates and by the enclosure 179, which is suitably sealed against those who are not authorized to enter into said enclosure. The circuit, however, is properly controlled by the handle 180 on the exterior of said enclosure, by means of which the service switch in said enclosure can be operated to open and close the circuit.

The service circuit after passing through the main switch is wired to the first load circuit through a service switch enclosure 181, fitted with a meter 182, which is interconnected to the service switch enclosure by means of the meter-adapter 183. The meter-adapter 183 is connected to the top of the service switch enclosure and a suitable end-plate is connected to the lower end of the service switch enclosure, which permits entry into said switch enclosure of the load conductors 184. The service switch enclosure 181 carries a service switch conforming to the capacity of the load circuit requirements. This service switch is likewise externally operated by means of the operating handle 185, and the apparatus and interconnections of the circuit are all encased in a protective housing, permanently sealed against those unauthorized to enter the protective enclosure.

In a like manner the load circuit connected to the conductors 186 is connected to the service circuit in the service switch enclosure 187 through a suitable end-plate, and the service switch enclosure 187 is interconnected to a meter 188 by means of a suitable meter-adapter 189, which permits connection of the meter to the lower end of the service switch.

The meter 190 and service switch enclosure 191 and meter 192 and service switch enclosure 193 are likewise interconnected by properly selecting the desired meter adapters having the correct meter configurations, and are all likewise fitted with wiring end-plates of the desired character.

It will be apparent from the illustration that the service leads 178 after entering the initial service switch enclosing box which is of a capacity suitable to serve all the load circuits, is encased in a protective housing which is inaccessible except to those authorized to open the service switches included within the system. It will also be apparent that the service switches shown are of various sizes, conforming to the capacities of the various load circuits, that the meters are of varying configuration, that the external wirings of the load circuits are of different character, and that consequently each combined service switch protective encasing entity, in each case, for each load circuit, is a special unit. According to the teachings of this invention, due to the flexibility and interchangeability of parts, it is possible to build any one and all of these units from a minimum number of parts, which can be readily interconnected, due to the standardized form of interconnection. When a system of protective service switch units of the type illustrated in Figure 37 is to be installed, therefore, it is possible for the manufacturer or jobber to meet the demand of the customer by merely selecting from stock the various parts in the line of meter-adapters and end-plates to be used and interconnecting these parts with the standardized basic switch units of the capacities desired.

Figure 38 shows another system for supplying power, in which the total load is metered at the initial or first service box 194, at which the service conductors enter the building. This type of system is utilized principally in factories, and in such a system each particular department is fitted with an enclosed service switch, such as 195, 196, 197 or 198, which is connected to the respective load circuit which feeds that respective department. In this case the meter which measures the entire load is interconnected with the large service switch enclosure 194, through which all the power or current fed to the building is conducted. From the service switch enclosure 194 the various circuits can obviously be distributed in any desired manner. In the specific embodiment thereof illustrated in Figure 38, the circuit is first carried to an ironclad cut-out box 199, from which one set of leads is carried to the service switch enclosure 195 and another set to the service switch enclosure 197, these both being enclosed in conduit 200 and 201 respectively. The leads to the service switch enclosures 196 and 198 are, as indicated, run as open wiring. The service switch enclosure 195 is fitted with a meter 202. This meter 202 can be readily connected in protective union with any of the service switch enclosures 195, 196, 197 or 198 respectively.

In a factory installation of this kind it is frequently desirable for the purpose of accounting, to measure the current consumed by a particular department or motor driven machine tool for a desired period, and under these circumstances a meter such as meter 202 is temporarily connected with any one of the service switches. In the particular circuit shown in Figure 38, this meter 202 is connected with the service switch enclosure 195 and will measure the load supplied to the department or motor driven machine tool connected to the wires enclosed in the conduit 203. It will be noted that while this reading for the purposes of accounting is being made, the meter 202 is connected in protective union with the switch enclosure 195, thereby obviating all possibility of tampering with the connections. When it is desired to make a reading for any of the other departments, it is merely necessary to disconnect the meter 202 and its adapter from the service-switch enclosure 195 and fit in its place a blank plate of the character illustrated at 167 in Figure 33, and then remove the meter 202 with its adapter to any of the other service switch enclosures or housings.

Consequently, due to the standardization of the interfitting and interlocking means whereby a meter may be rapidly and economically interconnected with a service switch enclosure in protective union, it is possible to utilize a single meter for checking up a plurality of load circuits. This obviously results in a marked economy because of the reduction in the number of meters which must be maintained to make the necessary readings if a proper load check is desired on the various departments.

It will now be apparent from the foregoing description that according to this invention, service switch enclosures are constructed which constitute standardized basic units, a basic unit being necessary for each capacity of service switch which it is desired to enclose in a protective casing. Cooperating with these basic standard service switch enclosure units are standard interconnecting means whereby any type, form, character or shape of end-plate suitable for admitting the load and service conductors can be connected with the enclosure. Likewise standard interconnecting means are provided for the meter-adapters whereby the meter-adapters may be connected with any of the standard basic switch enclosures.

With a system of this type, therefore, in order to meet the varying demands of service, it becomes necessary to carry on the shelves a minimum number of parts, comprising, service switch enclosures of the desired commercial capacities, meter-adapters equipped with meter trim configurations to meet the various meter forms in commercial practice, end-plates fitted with the commercial and desired wire-conducting means to fit the boxes of the various capacity, and aperture-restricting plates by means of which any of the end-plates smaller than the plate of maximum size used with the respective service switch enclosure box, and any meter adapter can be slidably and interchangeably interconnected in protective union with any basic standardized service switch enclosure unit.

The term current-carrying capacity as used in the aforesaid description and the following claims, refers and includes within its scope not only the ampere rating of the switches but refers likewise to the kind or type of circuit utilized with the switch or the enclosure, as, for example, whether a two-wire, three-wire, three-phase or two-phase or other type of circuit is used, which circuit serves to feed the current from the service circuit to the switch in the switch enclosure and to the load circuit from the switch in said switch enclosure.

Obviously the invention illustrated and described in this application is not limited to the specific form thereof therein shown, but is capable of many variations and other applications, within the spirit and scope of the invention, as pointed out in the following claims:

What is claimed is:

1. In a system of protective enclosures for electric service distributing systems, a plurality of enclosed basic switch units of the same or different size depending upon the current carrying capacities, said units being fitted with apertures of different sizes depending upon the size of the unit, a plurality of meters of the same or different configurations, a plurality of meter adapters, and means whereby any of the meter adapters can be connected to any one of said units in the said apertures, the said connection being readily detachable to facilitate interchangeability between the meter adapters and the basic units.

2. In a system of protective enclosures for electric service distributing systems, a plurality of enclosed basic switch units of the same or different size depending upon the current carrying capacities, said units being fitted with apertures of different sizes depending upon the size of the unit, a plurality of switch unit end plates of different sizes, a plurality of meters of the same or different configurations, a plurality of meter adapters, and means whereby any of the meter adapters and any of said plates can be connected to any of said units, the said connections being readily detachable to facilitate interchangeability between the meter adapters, the end plates and the basic units.

3. In a system of protective enclosures for electric service distributing systems, a plurality of basic service switch enclosures of different depths to accommodate service requirements of different capacities, the end walls of said basic units being apertured to receive end plates, the size of which is arranged to accommodate wire fittings to serve the ultimate capacity of the enclosures, meter adapters of different configurations, interconnecting means of uniform and standard size associated with the meter adapters to connect said adapters in protective union with said basic units, and means for adapting the end wall apertures in said units for protective union with certain of said standard meter adapter interconnecting means.

4. In a system of protective enclosures for electric service distributing systems, a plurality of switch protecting enclosures of different sizes depending upon the capacity of the switch enclosed, at least one of the walls of said enclosures having an aperture corresponding in size with the capacity of the enclosure, cooperating plates of different sizes, configurations and characteristics depending upon the said enclosure capacity and the service demands, meter adapters of different configurations provided with standardized means for interconnecting the adapters in protective union with one size of enclosure, and means whereby the meter adapters can be interchangeably connected with the said enclosures of other capacities and sizes.

5. In a system of protective enclosures for electric service distributing systems, a plurality of service switches or different capacities, a plurality of ironclad enclosures therefor of different sizes depending upon the switch capacities, the end walls of said enclosures having an aperture corresponding in size with the capacity of the enclosure, end plates of different sizes and characteristics depending upon the switch enclosure capacity and the service demands, meter adapters of various configurations provided with a means of uniform and standard size for interconnecting the adapter in ironclad union with the enclosures, and means whereby the meter adapters and all sizes of end plates equal to and less than the ultimate capacity of the particular enclosure can be interchangeably connected in the end wall apertures of any of said switch enclosures.

6. In a system of protective enclosures for electric service distributing systems, a plurality of service switches of different capacities, a plurality of ironclad enclosures therefor of different sizes depending upon the capacity of the switch enclosed, meter adapters of different configurations, and end plates for wire fittings of different sizes and configurations, the walls of said enclosures being apertured, and means to interchangeably connect the said meter adapters in ironclad union with said enclosures and to connect end plates of all sizes equal to and less than the ultimate capacity of the particular enclosure in interchangeable connection in the end wall apertures of any of the switch enclosures.

7. In a system of protective enclosures for electric service distributing systems, a plurality of service switches of different capacities and the protective enclosures therefor of different sizes depending upon the capacity of the switch enclosed, the walls of said enclosures having an aperture corresponding in size with the capacity of the enclosure meter adapters of different sizes and configurations, uniform standardized interconnecting means associated with said adapters to interconnect the meter-adapter with the aperture of some of said enclosures, and means to interconnect said standardized meter-adapter interconnecting means with other of the said different-sized apertures in other of said enclosures.

8. In a system of protective enclosures for electric service distributing systems, a plurality of service switches of different capacities and the protective enclosures therefor of different sizes depending upon the capacity of the switch enclosed, at least one of the walls of said enclosures having an aperture corresponding in size with the capacity of the enclosure, depending upon the capacity of the enclosure, meter adapters of different sizes and configurations, uniform standardized interconnecting means associated with said adapters, the said interconnecting means being of a size designed to cooperate with a switch enclosure aperture of minimum size, and means to interconnect said standardized meter-adapter interconnecting means with any of the said different-sized apertures in said enclosures of greater than minimum capacity.

9. In a system of protective enclosures for electric service distributing systems, a plurality of service switches of different capacities and the protective enclosures therefor of different sizes depending upon the capacity of the switch enclosed, at least one of the walls of said enclosures having an aperture corresponding in size with the capacity of the enclosure, depending upon the capacity of the enclosure, meter-adapters of different sizes and configurations, uniform standardized interconnecting means associated with said adapters to interconnect said meter-adapters with the apertures of some of said enclosures, plates of different sizes provided with conductor-admitting means, and means to interconnect said meter-adapter interconnecting means with other of the different-sized apertures in any of said enclosures, and to interconnect any end-plate adapted to cooperate with the maximum or less than the maximum enclosure capacity in any of said apertures.

10. In a system of protective enclosures for electric service distributing systems, a plurality of service switches of different capacities and the protective enclosures therefor of different sizes depending upon the capacity of the switch enclosed, said enclosures being differently apertured depending upon the capacity of the enclosure, end-plates and meter-adapters arranged to interchangeably and slidably fit in said apertures; a standard size interconnecting means for interlocking said adapters in said slidable connection with said enclosure having the minimum size aperture, and means for reducing the size of the larger apertures to the said standard size aperture.

11. In a system of protective enclosures for electric service distributing systems, a plurality of service switches of different capacities and the protective enclosures therefor of different sizes depending upon the capacity of the switch enclosed, opposite walls of said enclosure being apertured, meter adapters of different configuration and having standard interconnecting means, end-plates for wire fittings of different sizes, configurations and characteristics, and means adapted to be cooperatively used with said standard interconnecting means and said plates whereby any of said meter-adapters can be interchangeably interconnected with any of said protective enclosures, and said plates can be interchangeably interconnected in the aperture of an enclosure designed for a particular plate, or in the aperture of enclosures designed for larger plates.

12. In a switch unit the combination with a service switch and an ironclad enclosure for said switch, of conductor admitting means of different sizes and characteristics, of meter interconnecting means for connecting meters of different configuration in ironclad union with said service switch enclosure, and means whereby any of said conductor-admitting means and meter interconnecting means can be interchangeably and slidably interconnected with said switch enclosure to meet the varying demands of service.

13. In a switch unit the combination with a service switch and an ironclad enclosure for said switch, the end-walls of said enclosure being apertured, end-plates adapted to be fitted in said apertures, the said apertures being of a size capable to accommodate end-plates to receive conductors and conduits to serve the ultimate current-carrying capacity of the switch unit capable of being fitted in said enclosure, and means for restricting the size of said aperture to accommodate end-plates of varying sizes and configurations less than said maximum size.

14. In a switch unit the combination with a service switch and an ironclad enclosure therefor, the end-walls of said enclosure being apertured, meter-adapters and end-plates, the said apertures being of a size to receive end-plates suitable to carry the fittings for the conductors and conduits corresponding to the ultimate current carrying capacity of said switch enclosure, and means to restrict the end wall aperture to receive a meter-adapter suitable with a service switch enclosure of smaller current-carrying capacity.

15. In a switch unit the combination with a service switch and a protective ironclad enclosure for said switch, said enclosure having an aperture in at least one wall thereof of a plurality of conductor-admitting means of different sizes and characteristics, the conductor-admitting means being of a size larger and smaller than the aperture in the enclosure, and means for slidably and interchangeably interconnecting any one of said conductor-admitting means in said aperture in said ironclad enclosure.

16. In a switch unit the combination with a service switch and a protective enclosure for said switch, said enclosure having opposite wall members apertured, of a plurality of plates of different sizes larger and smaller than said apertures carrying conductor admitting means adapted to be interchangeably fitted in either of said apertures, and means for restricting the size of either of said apertures to slidably accommodate said plates of a size smaller than said apertures, the plates larger than said apertures being slidably interconnected over said wall aperture 17. In a switch unit the combination with a service switch and a protective enclosure for said switch, said enclosure being apertured, of a plurality of plates of different sizes carrying conductor admitting means adapted to be interchangeably fitted in said aperture and means for restricting the size of said aperture to slidably accommodate said plates of a size smaller than said aperture, the plates larger than said apertures being slidably interconnected over said enclosure aperture.

18. In a switch unit the combination with a service switch and a protective enclosure for said switch, said enclosure having opposite wall members apertured, of a plurality of meter-adapters of different configuration, capable of interchangeable interconnection with apertures of a size smaller than the apertures in said wall members, standard interconnecting means associated with all of said adapters, and means for restricting the size of said apertures to accommodate and interconnect the standard meter interconnecting means with said apertures.

19. In a switch unit the combination with a service switch and a protective enclosure for said switch, said enclosure being apertured, of a plurality of meter adapters of different configurations, capable of interchangeable interconnection with apertures of a size smaller than the aperture in said enclosure, and means for restricting the size of said aperture in said enclosure to accommodate and interconnect the meter interconnecting means therewith.

20. In a protective casing for service switch and meter connecting appliances, in combination, a basic service switch unit including a service switch and protective enclosure for said switch, said enclosure having a cover, of a plurality of conductor-admitting means of different sizes, of a plurality of meter-adapters of different configurations, means for interchangeably interconnecting any of said conductor admitting means and any of said adapters to opposite walls of the said casing, and means for locking said adapters and conductor-admitting means in position with said cover.

21. In a protective casing for switch and meter connecting appliances, in combination, a basic service switch unit including a service switch and protective enclosure for said switch, said enclosure having opposite wall members apertured, and being fitted with a cover, of a plurality of conductor-admitting means, of a plurality of meter-adapters of different configurations, standard interconnecting means associated with all of said adapters, means for restricting the size of said apertures to accommodate and interconnect the standard interconnecting means of said adapters with said enclosure and also any one of said plurality of conductor-admitting means of smaller size than said apertures, and means for locking said adapter and conductor-admitting means in position with said cover.

22. In a protective enclosure for electric service distributing systems, a switch unit provided with a unitary enclosure therefor having one or more apertures in the wall thereof, a meter-adapter provided with meter interfitting means and enclosure interfitting means for connecting said meter adapter to said unit, said unit, and said adapter each constituting one of a series of similar units, of different sizes or configurations, the said members of said series being adapted for interchangeable interconnection to fit the apertures in said enclosures irrespective of the sizes of the unitary enclosure and its associated apertures.

23. In a protective enclosure for electric service distributing systems, a switch unit provided with a unitary enclosure therefor having one or more apertures in the wall thereof, a plate equipped with wire fitting means and enclosure fitting and interconnecting means, said unit and said plate each constituting one of a series of similar units of different sizes or configurations, the members of said plate series being adapted for interchangeable interconnection to fit the apertures of said enclosures of any of said unit series.

24. In a protective enclosure for electric service distributing systems, a switch unit provided with a unitary enclosure therefor having one or more apertures in the wall thereof, a meter adapter provided with meter interfitting means and enclosure interfitting means for connecting said meter adapter to said unit, a plate for wire-fitting means, enclosure interfitting and interconnecting means for said plate, said unit, said adapter, and said plate each constituting one of a series of similar units of different sizes or configurations, the members of said plate and adapter series being each adapted for interchangeable interconnection to fit the apertures in said enclosures of any one of said unit series.

25. In a system of protective enclosures for electric service distributing systems, a new article of manufacture consisting of a basic enclosed service switch unit which is a one-piece entity and which is equipped with standardized fittings comprising meter adapters, standardized plates of different sizes provided with conductor admitting means, and standardized conductor restricting means, said standardized fittings being readily detachable and interchangeably fitted in said unit.

26. In a system of protective enclosures for service switch units, comprising a plurality of units of different capacities, a casing forming a wiring gutter or trough and standard means associated with either end of said casing including an aperture restricting means surrounding the walls of said trough for interconnecting the said trough with switch enclosures of the same or different capacities.

27. In a system of protective enclosures for service switch units, switch enclosing means of different capacities depending upon the capacity of the enclosed switch, a casing forming a wiring trough, standard interfitting means associated with either end of said casing for interconnection with said switch enclosure of minimum capacity, and means for adapting said standard interconnecting means in protective interconnection with switch enclosing means of more than minimum capacity.

28. The combination with the wall of a sheet metal box provided with an aperture, of interchangeable end pieces having slots, said end pieces being secured to the inner face of said wall, the slot of an end piece reducing the aperture in said wall, a meter adapter, and attaching means on said meter adapter to engage the end pieces adjacent to the slots with the body of the meter adapter extending outwardly therefrom.

29. The combination with the wall of a sheet metal box provided with an aperture, portions of said wall forming an enclosing border for said aperture, an end piece having a slot, said end piece being secured to the inner face of said wall, the slot of the end piece reducing the aperture in said wall, a meter adapter, and attaching means on said meter adapter to engage the end piece adjacent to the slot with the body of the meter adapter extending outwardly therefrom.

30. The combination with the wall of a sheet metal box provided with an aperture, an end piece having a slot, said end piece being secured to the inner face of said wall, the slot of the end piece reducing the aperture in said wall, a meter adapter, and securing flanges on said adapter to engage said end piece adjacent to the slot, with the body of the meter adapter extending outwardly therefrom, the aperture in said wall being sufficiently large to permit passage therethrough of the meter adapter with its securing flanges.

31. The combination with the wall of a sheet metal box provided with an aperture, fingers formed on the inner face of said wall, of an end piece secured in place by said fingers and having a slot to reduce the aperture in said wall, a meter adapter, and securing fingers on said meter adapter engaging said end piece adjacent to the slot, with the body of the meter adapter extending outwardly therefrom.

32. The combination with the wall of a sheet metal box provided with an aperture, fingers formed on the inner face of said wall, of an end piece secured in place by said fingers and having a slot to reduce the aperture in said wall, a meter adapter, and securing fingers on said meter adapter engaging said end piece adjacent to the slot, with the body of the meter adapter extending outwardly therefrom, the aperture in said wall being sufficiently large to permit the passage of the meter adapter with its gripping fingers therethrough to be there engaged by the end piece.

33. The combination with the wall of a sheet metal box provided with an aperture, fingers formed on the inner face of said wall, of an end piece secured in place by said fingers and having a slot to reduce the aperture in said wall, a meter adapter, and securing fingers on said meter adapter engaging said end piece adjacent to the slot with the body of the meter adapter extending outwardly therefrom, a lid for said metal box adapted to engage said wall, and thereby preventing removal of said end piece when the lid is closed.

34. In combination with a switch box, having an apertured wall, an apertured adapter plate removably secured thereto, a meter adapter hood provided with a laterally extending portion adapted to be received within the apertured adapter plate and secured in position thereby.

35. In combination with a switch box provided with an apertured wall, a reducing plate removably secured to the inner side of said apertured wall and having a slot, to cooperate with said apertured wall to close a portion of the aperture therein, of a closing plated adapted to receive wires therethrough, having securing flanges thereon to receive the portions of said reducing plate adjacent to its slot.

36. The combination with a service box having a discontinuous wall, of means for restricting the discontinuous portion on three sides thereof, said means being adapted to receive inter-engageable fittings.

37. The combination with a service box having a discontinuous wall, of means for restricting the discontinuous portion thereof, said means being adapted to receive inter-engageable interchangeable fittings to thereby suitably adapt the box for different service connections.

38. The combination with a service box having an apertured wall, a plate having an open slot, and means for removably retaining the plate alongside the wall and in position for partially closing the aperture, of a sheet metal fitting passing through the aperture and the slot engaging an edge of the aperture in the wall, said fitting having flanges engaging the inner side of the plate whereby the fitting is securely locked in place.

39. In combination a removably and slidably mounted plate fitted with top and side walls to provide an opening therein for restricting an opening in the wall of a service box, a sheet metal shield extending outwardly from the plate adjacent the opening and in position to protect wires passed therethrough, and means struck up from one of said parts to removably and slidably lock the shield in such position.

40. The combination with a metal wall of a service box, said wall having an aperture, a plate having an open slot, means for removably retaining the plate alongside the wall and in position for partially closing the aperture, of interchangeable fittings provided with means for removably engaging the walls enclosing the slot.

41. The combination with a metal wall of a service box, said wall having an aperture, a plate having an open slot, means for removably retaining the plate alongside the wall and in position for partially closing the aperture, of interchangeable fittings including means for removably engaging the walls enclosing the slot and extensions which pass outwardly through the aperture and slot and provide means for protecting lead wires.

In witness whereof I have hereunto set my hand the 21st day of March, 1919.

BRYSON D. HORTON.

CERTIFICATE OF CORRECTION.

Patent No. 1,628,406.                                 Granted May 10, 1927, to

BRYSON D. HORTON.

It is hereby certified that error appears in the printed specification of the above numbered patent requiring correction as follows: Page 3, line 24, for the word "adapted" read "adapter"; page 12, line 59, claim 5, for the word "or" read "of"; page 13, line 18, claim 9, for the word "other" read "any", and line 19, for the word "any" read "other"; and that the said Letters Patent should be read with these corrections therein that the same may conform to the record of the case in the Patent Office.

Signed and sealed this 28th day of June, A. D. 1927.

Seal.                                               Acting Commissioner of Patents.